United States Patent [19]

Miyoshi et al.

[11] 4,070,433

[45] Jan. 24, 1978

[54] CASTING FILMS OF POLY(META-PHENYLENE ISOPHTHALAMIDE) AND ITS COPOLYMERS

[75] Inventors: Akira Miyoshi; Masanori Masuda, both of Uji; Tamihiro Nakayama, Joyo, all of Japan

[73] Assignee: Unitika Ltd., Amagasaki, Japan

[21] Appl. No.: 696,652

[22] Filed: June 16, 1976

[30] Foreign Application Priority Data

Nov. 4, 1975 Japan ............................... 50-132751

[51] Int. Cl.$^{2}$ ............................................ B29D 7/24

[52] U.S. Cl. .............................. 264/233; 260/47 CZ; 260/78 R; 260/78 A; 264/216; 264/237; 264/291; 264/331

[58] Field of Search ................ 264/216, 28, 331, 299, 264/233, 237, 344, 348, 288, 289, 184, 234, 291; 260/78 A, 78 R

[56] References Cited

U.S. PATENT DOCUMENTS

| | | | |
|---|---|---|---|
| 3,006,899 | 10/1961 | Hill, Jr. et al. | 260/78 |
| 3,063,966 | 11/1962 | Kwolek et al. | 260/78 |
| 3,094,511 | 6/1963 | Hill, Jr. et al. | 260/78 |
| 3,354,127 | 11/1967 | Hill, Jr. et al. | 260/78 |
| 3,414,645 | 12/1968 | Morgan, Jr. | 264/210 F |
| 3,696,076 | 10/1972 | Vogelfanger | 260/78 R |

*Primary Examiner*—James B. Lowe
*Attorney, Agent, or Firm*—Sughrue, Rothwell, Mion, Zinn and Macpeak

[57] ABSTRACT

An aromatic polyamide film having a dielectric strength of at least about 150 kv/mm which is useful as an electric insulating material. This film is obtained by casting a solution comprising poly(m-phenylene isophthalamide) or a copolymer thereof and an amide type solvent, drying the cast product to form a film having a residual solvent content of not more than about 60% by weight, immersing the film in an aqueous medium kept at not more than about 20° C, and stretching the resulting wet film containing at least about 5% by weight of the aqueous medium in at least one direction to at least about 1.4 times the original dimension.

20 Claims, No Drawings

CASTING FILMS OF POLY(META-PHENYLENE ISOPHTHALAMIDE) AND ITS COPOLYMERS

BACKGROUND OF THE INVENTION

1. Field of the Invention

This invention relates to a film comprising poly(m-phenylene isophthalamide) having especially superior properties as an electric insulating material, and a process for its production.

2. Description of the Prior Art

It is known that poly(-m-phenylene isophthalamide) and its copolymers have superior thermal stability, and the development of various fabricated articles using such polymers, for example, fibers or films, has been under way.

As regards such films, U.S. Pat. Nos. 3,006,899 and 3,063,966 disclose that films prepared from poly(m-phenylene isophthalamide) and its copolymers are useful as thermally stable insulating materials. These patents also disclose a process for producing films which comprises casting a solution of the above polymer in dimethyl formamide containing lithium chloride into film form, heating the cast film in a hot oven to evaporate off the solvent, immersing the resulting film in hot water to remove the remaining solvent and the salts, and then drying the film in vacuum to obtain a final film product, and a process for obtaining a biaxially oriented film by heating the above cast film in a hot oven to evaporate off the solvent, and subjecting the resultant film to a hot rolling in two directions.

U.S. Pat. No. 3,094,511 discloses a process for obtaining a biaxially oriented film which comprises dissolving a copolymer obtained by reacting 70 mol% of isophthaloyl chloride and 30 mol% of terephthaloyl chloride with m-phenylenediamine in dimethyl formamide, casting the resultant solution into film form, washing the cast film with water, drying it, and stretching it at an elevated temperature under steam pressure using a two-way stretcher.

U.S. Pat. No. 3,354,127 discusses the mechanical properties of hot-stretched films composed of poly(m-phenylene isophthalamide) or its copolymers.

Furthermore, U.S. Pat. No. 3,696,076 discloses a process for producing films which comprises subjecting a cast film prepared from a similar polymer solution, i.e., a solution of a copolymer prepared by reacting a mixture of isophthaloyl chloride and phthaloyl chloride (molar ratio: 70:30) with methaphenylenediamine, to a "stage-curing" wherein the curing temperature is progressively elevated from about 130° C to a temperature above 200° C.

With these conventional techniques, it is difficult to produce aromatic polyamide films having especially superior properties as an electric insulating material.

Poly(m-phenylene isophthalamide) cannot be melt-shaped because of its infusibility, and, therefore, it is generally fabricated by a wet shaping process or a dry shaping process from a dope in an amide type solvent such as those described hereinbelow. Film preparation by a wet process or a dry process, however, possesses economic and technical disadvantages, and results in films having unsatisfactory properties.

For example, in a wet process the choice of a coagulating agent is in itself a problem, and even when special consideration is given, for example, to the coagulating ability of the coagulating agent, the coagulating time, and the coagulating temperature, the resulting film is opaque, and films having superior mechanical and electrical properties cannot be obtained.

The dry process involves evaporating off the solvent in a heated atmosphere. However, since the amide type solvent generally used has a high boiling point and a high latent heat of evaporation, the drying of the film requires high temperatures and long times. In other words, very long times are required in order to obtain a solvent-free film product by evaporating off the solvent in a cast film prepared from a solution comprising an aromatic polyamide and an amide type solvent by drying or curing alone. Furthermore, unstretched films obtained after mere solvent removal have only unsatisfactory electrical and mechanical properties as an electric insulating material. When the solvent is removed by drying the cast film, evaporation of the solvent from the film proceeds relatively rapidly until the residual solvent content of the film reaches about 20% by weight, but further evaporation of the solvent becomes extremely difficult. For example, when the film is treated at a temperature of as high as above 200° C in an attempt to obtain a film having a thickness of 25 microns, drying for more than 10 hours is required in order to reduce the residual solvent content to less than 5% by weight.

When a solution containing inorganic salts is used, the inorganic salts have a strong affinity for the amide type solvent and form soluble complexes which inhibit the evaporation of the solvent. For this reason, it is practically impossible to evaporate and remove all of the solvent only by drying or curing.

Accordingly, in order to obtain solvent-free product films, it is necessary to first evaporate off the solvent to some extent by drying, and then wash the film with water to remove the remaining solvent and/or inorganic salts. Various investigations we made in this regard, however, led to the discovery that with a conventional washing with hot water, the resulting films do not possess especially superior properties as an electrical insulating material. Films obtained by a conventional washing in hot water do not possess superior properties as an electric insulating material, not only in the unstretched state, but also in the stretched state attained after the application of a conventional stretching technique such as hot rolling, stretching at elevated temperatures under steam pressure, or a hot stretching treatment.

Transparent aromatic polyamide films, therefore, do not exist in the market, and only insulating papers formed by paper forming techniques from fibers and fibrid particles are now available to some extent as an electrical insulating material. With such insulating papers, however, superior insulating performance cannot be obtained.

The properties of films as an electric insulating material can be shown by their dielectric strength. The "dielectric strength", as preferred to in the present application, is measured by the method described in ASTM D-149-64.

SUMMARY OF THE INVENTION

Accordingly, it is an object of this invention to provide a novel aromatic polyamide film suitable as an electric insulating material having good dielectric strength and a process for its production. The aromatic polyamide film having such high performance could not be obtained by the known prior methods described hereinabove.

We performed extensive research in an attempt to solve the above problems encountered with poly(m-phenylene isophthalamide) films and processes for their preparation, and to obtain films having superior properties as an electrical insulating material. This research led to the present invention.

According to the present invention, there is provided an aromatic polyamide film comprising an aromatic polyamide in which at least about 50 mol% of its entire recurring units are recurring units of the general formula:

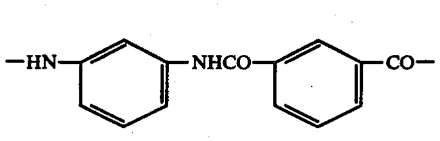

said film having a dielectric strength of at least about 150 kv/mm.

The invention also provides a process for producing an aromatic polyamide film from a solution of an aromatic polyamide having the above recurring unit in an amide type solvent, which comprises casting said solution into a film form of about 5 to about 250 μ, preferably 10 to 25 μ, drying the cast film to form a film having a residual solvent content of not more than about 60% by weight, preferably about 20 to about 60% by weight, more preferably 20 to 50% by weight, most preferably 20 to 40% by weight, immersing the film in an aqueous medium at a temperature of not more than about 20° C, and then stretching the resulting wet film containing at least about 5% by weight, based on the wet film, of the aqueous medium in at least one direction to at least about 1.4 times the original dimension.

The aromatic polyamide films of this invention have superior thermal stability characteristics, electric insulating characteristics and mechanical characteristics, and, in particular, have a dielectric strength, which represents their electric insulating characteristics and is measured by the method of ASTM D-149-64, of at least about 150 kv/mm, and under preferred conditions in accordance with this invention, at least 180 kv/mm, further at least 200 kv/mm, and especially at least 210 kv/mm. The aromatic polyamide films of this invention are, therefore, useful, for example, for the insulation of a rotor and a stator in an electric motor, or for the insulation of transformers.

DETAILED DESCRIPTION OF THE INVENTION

The aromatic polyamide in which at least about 50 mol% of its entire recurring structural units are recurring units of the general formula:

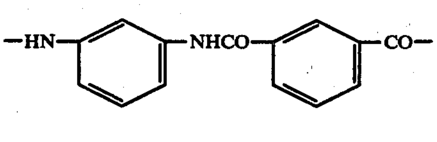

denotes a poly(m-phenylene isophthalamide) homopolymer or a copolymer derived from an m-phenylene isophthalamide unit and a comonomer copolymerized therewith in proportions which do not adversely affect the superior thermal stability of the poly(m-phenylene isophthalamide). Mixtures of homopolymers and copolymers can, of course, be used.

Examples of the comonomer that can be copolymerized in proportions which do not adversely affect the superior thermal stability of poly(m-phenylene isophthalamide) include amine components such as p-phenylenediamine, 4,4'-diaminodiphenyl ether, 4,4'-diaminodiphenyl sulfone, benzidine, hexamethylenediamine, piperazine, 2,5-dimethylpiperazine, hydrazine hydrochloride, or 4,4'-diaminodiphenylmethane, acid components such as terephthaloyl chloride, diphenyldicarboxylic acid chloride, naphthalene-1,4-dicarboxylic acid chloride, naphthalene-1,5-dicarboxylic acid chloride, monochloroterephthaloyl chloride, adipoyl chloride or cyclohexane-1,6-dicarboxylic acid chloride, and m- or p-aminobenzoyl chloride hydrochloride. Of these, p-phenylenediamine, 4,4'-diaminodiphenyl ether, terephthaloyl chloride and m- or p-aminobenzoyl chloride hydrochloride are preferred. These comonomers can be used either alone or in admixture.

The content of the comonomer units in the copolymer should be not more than about 50 mol%. If the amount of the comonomer units exceeds about 50 mol%, the thermal stability of the copolymer is reduced to a large extent, and, from the standpoint of thermal stability, the content of comonomer units in the polymer is desirably not more than 20 mol%.

The aromatic polyamides described above can be synthesized by known methods, for example, the interfacial polycondensation process shown in U.S. Pat. No. 3,006,899 or the low temperature polycondensation process shown in U.S. Pat. No. 3,063,966.

The aromatic polyamides used in this invention have a logarithmic viscosity [$\eta_{inh}$], determined at 25° C for a solution of the polymer in 96% sulfuric acid in a concentration of 0.5 g/100 ml, of about 0.6 to about 3.0, preferably 1.0 to 2.0.

The amide type solvent used in this invention denotes at least one compound selected from the group consisting of N,N-dimethyl acetamide, N-methyl-2-pyrrolidone, N,N-dimethyl formamide, N-methyl piperidone, N-methyl caprolactam, N,N,N',N'-tetramethylurea, and N,N,N',N',N'',N''-hexamethyl phosphoramide. Of these, N,N-dimethyl acetamide, N-methyl-2-pyrrolidone, and N,N-dimethyl formamide are especially preferred. These solvents are selected properly according to the type of polymer used. In order to increase the polymer solubilizing power of the amide type solvent, a salt such as lithium chloride or calcium chloride may be added to it, if desired.

Some of the amide type solvents described above are also used as a polymerization solvent for the preparation of aromatic polyamides. A solution comprising an aromatic polyamide and an amide type solvent can be obtained directly by the low temperature polycondensation of the corresponding diamines with dicarboxylic acid halides in an amide type solvent. It can also be obtained by pouring the polycondensation product obtained by a low temperature polycondensation or interfacial polycondensation into a non-solvent to isolate and purify the polymer, and dissolving the polymer in the amide type solvent which can optionally contain a salt. Where long periods of time are required to re-dissolve the isolated polymer, it is convenient to add a salt such as lithium chloride or calcium chloride to the amide type solvent in order to increase the polymer solubilizing power of the amide solvent, or to form a copolymer containing the comonomer units in an amount of not more than about 50 mol%, preferably not more than 20 mol%, so as to shorten the dissolving time.

The amount of the salt added to the amide type solvent may be not more than the saturation concentration of the salt in the polymer solution, but generally, it is suitably about 1 to about 10% by weight.

As stated above, a solution obtained by low temperature polycondensation can be directly used as a film forming dope. Since, in such a case, a metal hydroxide such as calcium hydroxide or lithium hydroxide is used to neutralize the hydrogen halide generated during the polycondensation, the resulting polymer solution necessarily contains salts such as calcium chloride or lithium chloride.

The presence of the above salts in the solution is very effective for the stabilization of the solution and increasing of the solubility of the polymer. In other words, these salts serve to prevent the gellation of the solution at the time of film preparation or the opacification of the resulting film. However, when the solution contains electrolytic salts, the electric insulation of the resulting film becomes poor. In order, therefore, to obtain films having superior electric insulating properties, these salts are removed by washing the film with water.

The concentration of the polymer in the film forming dope used in this invention varies according to the type of the polymer or the type of the solvent, but generally, is about 10 to about 25% by weight, preferably 18 to 22% by weight.

In the production of films by the process of this invention, the polymer solution is first cast, and the cast product is dried to form a film having a residual solvent content of not more than about 60% by weight, preferably about 20 to about 60% by weight, more preferably 20 to 50% by weight, most preferably 20 to 40% by weight. The resulting film is then immersed in an aqueous medium at a temperature of not more than about 20° C. Casting of the polymer solution does not require any special technique, and any conventional method can be used. For example, the polymer solution can be cast on a glass plate, a metal plate, a rotary drum, or a belt to obtain a cast film. In the present invention, the cast film is then dried until its residual solvent content becomes not more than about 60% by weight. The "residual solvent content", as referred to in the present invention, is defined by the following equation.

$$\text{Residual solvent content (wt\%)} = \frac{\text{Weight of the solvent in the film}}{\text{Weight of the film}} \times 100$$

Films having a residual solvent content of more than about 60% by weight become opaque upon immersion in aqueous media even when the temperature of the aqueous medium is lower than about 20° C, and, therefore, the resulting films have deteriorated electrical characteristics.

When films having a residual solvent content of not more than about 60% by weight are immersed in an aqueous medium held at a temperature of not more than about 20° C, preferably not more than 10° C but above the melting point of the aqueous medium, they do not become opaque. Preferably the time of immersion is for about 1 second to about 5 minutes. In addition, once the films have been cooled by immersion in aqueous media at not more than about 20° C, they no longer become opaque even when they are subsequently immersed in an aqueous medium kept at a temperature higher than about 20° C.

Generally, drying of a highly viscous solution in the thin film state having a viscosity of more than several hundred poises proceeds at a progressively decreasing rate, and the speed of diffusion of the solvent inside the thin film controls the speed of drying. Hence, the speed of drying becomes extremely slow as the drying proceeds to cause an increase of the polymer concentration in the thin film, and, therefore, an increase of its viscosity. In the present invention, it is industrially difficult to reduce the residual solvent content to not more than about 20% by weight. Hence, it is industrially advantageous, in view of the productivity of film preparation and the properties of the resulting film, to stop the drying of the film when its residual solvent content has reached not more than about 60% by weight but more than about 20% by weight, preferably not more than 50% by weight, more preferably not more than 40% by weight, but more than 20% by weight, and to wash the film with an aqueous medium having a high solvent extraction rate.

Drying of the cast product can be performed by conventional heating methods such as blowing hot air, high frequency irradiation or infrared irradiation. Usually, the drying requires a period of about 5 minutes to about 5 hours at temperatures of about 110° to about 200° C, although it varies according, for example, to the type of the amide type solvent used or the thickness of the cast product.

As stated above, it is necessary in the present invention to immerse the film having a residual solvent content of not more than about 60% by weight in an aqueous medium held at a temperature of not more than about 20° C, preferably not more than 10° C. Water is suitable as the aqueous medium used in this invention. An aqueous solution containing the amide type solvent can also be used as the aqueous medium. Especially suitable amide type solvents are N,N-dimethyl acetamide, N-methyl-2-pyrrolidone, and N,N-dimethyl formamdide. The aqueous solution containing the amide type solvent may contain salts such as lithium chloride or calcium chloride up to the saturation concentration, but, preferably, the concentration of the salts is as low as possible. The concentration of the amide type solvent is preferably not more than about 40% by weight, especially not more than about 20% by weight, and more preferably not more than about 10% by weight, based on the aqueous medium. When the content of the amide type solvent exceeds about 40% by weight, the film becomes opaque, and its electrical properties tend to deteriorate.

The film immersed in the aqueous medium held at a temperature of not more than about 20° C is cooled as a result of immersion, and the solvent and/or salts remaining in the film are extracted. The extraction of the solvent or salts is possible even at low tempertures, but the rate of extraction increases with increasing temperature. Hence, transparent films can be produced within short periods of time by stopping the drying of the film at a desired stage where the residual solvent content of the film has reached not more than about 60% by weight, thereafter immersing the film in the aqueous medium at not more than about 20° C, and continuing the extraction of the solvent and the salts in this state, or preferably first immersing the film in the aqueous medium at not more than 20° C to cool it and then extracting the solvent and the salts with an aqueous medium at a temperature higher than 20° C.

The immersion time required to cool the film varies according, for example, to the thickness of the film, the film drying temperature, the type and amount of the solvent remaining in the film, or the temperature of the aqueous medium, but is usually from about 1 second to about 5 minutes.

Immersion of the film in the aqueous mediun at not more than about 20° C can be achieved, for example, by introducing the film into the aqueous medium, or spraying the aqueous medium onto the film.

In order to obtain films having especially superior electrical properties in accordance with the present invention, the wet film containing at least about 5% by weight, based on the weight of the wet film, of the aqueous medium must be stretched in at least one direction to at least 1.4 times the original dimension.

As earlier indicated, water is suitable as the aqueous medium. An aqueous medium containing an amide type solvent can also be used as the aqueous medium. Especially preferred amide type solvents are N,N-dimethyl acetamide, N-methyl-2-pyrrolidone, and N,N-dimethyl formamide. The aqueous solution containing the amide type solvent containing salts such as lithium chloride or calcium chloride up to the saturation concentration can be used. However, the salt concentration is desirably as low as possible since where the salts remain in the product film, the electrical properties of the film deteriorate. Accordingly, it is desirable to remove the salts by washing the film with water after stretching. Desirably, the concentration of the amide type solvent is not more than about 40% by weight, especially not more than 20% by weight, best of all not more than 10% by weight, based on the weight of the aqueous solution. When the content of the amide type solvent is more than about 40% by weight, the film becomes opaque and its electrical properties tend to deteriorate.

Since residual amide type solvent in the product film causes a deterioration in its electrical properties, it is desirably removed by washing the film with water, or drying it, after stretching.

In the present invention, the content of the aqueous medium in the wet film should be at least about 5% by weight based on the weight of the wet film. Otherwise, the advantages of the present invention cannot be attained. When the content of the aqueous medium is less than about 5% by weight, stretching stress at the time of stretching becomes excessively high, and it is virtually impossible to stretch the film to at least 1.4 times the original dimension in at least one direction. The aqueous medium present in the wet film in the specified amount serves to restrict the stretching stress within a preferred range, and acts effectively to insure satisfactory stretching. Wet films containing at least about 5% by weight, preferably at least 20% by weight, of the aqueous medium can be stretched smoothly without heating. Although there is no specific limitation with respect to the upper limit of aqueous medium content, it is preferred that the wet film which is obtained after immersion or washing usually containing about 45% to about 65% by weight of aqueous medium, as described hereinbelow, be stretched as it is without any additional treatment.

The wet film can be obtained, for example, by immersing a film having a residual solvent content of not more than about 60% by weight in an aqueous medium held at not more than about 20° C, and then washing it with the same, or a different, aqueous medium held at not more than about 20° C. The washing time is determined according to the residual solvent content. Although there is no limitation to the washing time usually washing is conducted for about 5 minutes to about 2 hours. The wet film can also be obtained by immersing a film having a residual solvent content of not more than about 60% by weight in an aqueous medium at not more than about 20° C to cool the film, and washing it with an aqueous medium kept at a higher temperature. Furthermore, it can be obtained by immersing the film after washing in water or an aqueous solution containing an amide type solvent. The film after immersion or washing usually contains about 45% to about 65% by weight of the aqueous medium. The term "wet film containing at least about 5% by weight of the aqueous medium", as referred to in the present application, also denotes those where the film after immersion or washing is present in the aqueous medium.

It is necessary that the stretch ratio be at least about 1.4. Since higher stretch ratios within the stretchable range afford films with better electrical and mechanical properties, the stretch ratio is preferably at least 1.5, especially at least 2. When the stretch ratio is less than about 1.4, the improvement of the electrical insulating properties of the film intended by this invention cannot be achieved. The stretching may be done in one direction, but preferably is in two directions crossing each other at right angles. In the case of a monoaxial stretching, the stretch ratio is preferably at least about 1.5, especially about 2.0 to 4.0. In the case of a biaxial stretching, the stretch ratio in either one of the machine and transverse directions should be at least about 1.4, but preferably the stretch ratio in one direction is at least about 1.3, and the stretch ratio in the other direction is at least about 1.5, especially about 2.0 to 3.0 in the other direction.

The stretching can be performed by any conventional methods. For example, in a monoaxial stretching, a machine direction stretching between rolls having different speeds is preferred. In the case of a biaxial stretching, there can be employed a "successive biaxial stretching method" wherein the film is first stretched in the machine direction using rolls and then in the transverse direction using a tenter. A simultaneous biaxial stretching method using a simultaneous two-way stretcher can be even more suitably employed.

The wet stretching described above can be performed at room temperature. While the stretching can be performed at any temperature so long as the aqueous medium contained in the wet film is maintained liquid and its content is adjusted to at least about 5% by weight, in view of the economy of film production, it is preferred to stretch the film at room temperature.

The film after wet stretching is dried, or first washed with water and then dried, to afford a final film product.

Drying of the wet film can be performed by any conventional method, but preferably is carried out at about 50° C to about 200° C using a tenter or roll.

The aromatic polyamide film so obtained can be used without further treatment, and, therefore, does not particularly require post treatments such as hot stretching or heat setting. The above mentioned properties of the film are not particularly improved by the hot stretching or heat setting, but, if desired, the film may be hot stretched or heat set. Where the hot stretching or heat setting is performed, the treating temperature is suitably at least 250° C but below the decomposition point of the aromatic polyamide film. At high temperatures, hot stretching or heat setting is desirably carried out in an inert gas. The hot stretching or heat setting can be performed by any conventional method, for example, using a tenter or roll.

The following examples illustrate the present invention more specifically. Unless otherwise indicated, all parts and percentages used herein are by weight and all processings were at room temperature and atmospheric pressure.

EXAMPLE 1

By the method disclosed in U.S. Pat. No. 3,063,966, a cylindrical glass vessel having an inside diameter of 70 mm was charged with 64.8 parts of m-phenylenediamine purified by distillation and 567.6 parts of N,N-dimethyl acetamide, and in an atmosphere of nitrogen, the contents were stirred by a helical stirring rod disposed with a clearance of 3 mm from the inside wall of the vessel to form a uniform solution. The vessel was cooled with ice, and 121.8 parts of powdery isophthaloyl chloride was added so that the temperature of the inside of the vessel did not exceed 30° C. The addition required 2 minutes. After the addition, the mixture was further stirred at room temperature for 30 minutes to afford a pale yellow viscous liquid which was found to contain 18% of poly(m-phenylene isophthalamide).

A part of the reaction mixture was collected, and a large quantity of cold water was added with stirring at high speed. The resulting precipitate was collected, and dried. The product had a logarithmic viscosity [$\eta_{inh}$], as determined at 25° C for a solution of the polymer in 96% sulfuric acid in a concentration of 0.5 g/100 ml, of 1.67.

Powdery calcium hydroxide (22.2 parts) was added to the remaining reaction mixture while cooling. The mixture was thus neutralized to afford a stable polymer solution. The polymer solution was cast on a glass plate, and dried in a hot air dryer at 130° C for 10 minutes to form a film having a residual solvent content of 38.5%. The film was withdrawn from the dryer, immediately immersed in cold water at 5° C for 1 minute, and then washed with flowing water at 20° C until the N,N-dimethyl acetamide and calcium chloride could no longer be detected in the wash liquid (30 minutes) to obtain a water wetted film substantially free from N,N-dimethyl acetamide and calcium chloride with the residual content of each of N,N-dimethyl acetamide and calcium chloride being less than 1% based on the weight of the water wetted film. The wet film contained 55% of water. The wet film was then stretched at room temperature simultaneously in the machine and transverse directions at a ratio of 2.3 in each direction, and then dried at 110° C for 30 minutes to afford a transparent poly(m-phenylene isophthalamide) film having a thickness of 0.025 mm. The resulting film was found to have a dielectric strength of 240 kv/mm, a tensile strength at break of 27 kg/mm$^2$ in both the machine and transverse directions, and an elongation at break of 73% in both directions.

When the above film was heated for 5 minutes at 330° C in a nitrogen atmosphere under tension at constant length, it had a dielectric strength of 235 kv/mm, a tensile strength at break of 27 kg/mm$^2$ in both the machine and transverse directions, and an elongation at break of 35% in both directions.

COMPARATIVE EXAMPLE 1

The water wetted film obtained in Example 1, without stretching, was dried at 110° C for 30 minutes under tension at constant length. The resulting film had a dielectric strength of 121 kv/mm, a tensile strength at break of 9 kg/mm$^2$ both in the machine and transverse directions, and an elongation at break of 113% in both directions. The film was therefore much inferior to the film obtained in Example 1 in accordance with this invention.

The film obtained by drying under tension at constant length was further heat treated at 330° C for 5 minutes in a nitrogen atmosphere under tension at constant length. The resulting film had a dielectric strength of 136 kv/mm, a tensile strength at break of 11 kg/mm$^2$ both in the machine and transverse directions, and an elongation at break of 42% in both directions. The resulting film was inferior to the film obtained in Example 1.

COMPARATIVE EXAMPLE 2

The water wetted film obtained in Example 1 was dried at 110° C for 30 minutes to reduce its water content to less than 1%, and then hot stretched simultaneously both in the machine and transverse directions at a stretch ratio of 1.5 in each direction at 330° C in a nitrogen atmosphere. Further stretching was impossible because of breaking of the film. The resulting film had a dielectric strength of 140 kv/mm, and was inferior to the film obtained in Example 1.

COMPARATIVE EXAMPLE 3

The same polymer solution as used in Example 1 was cast on a glass plate, and dried in a hot air dryer at 130° C for 3 minutes to form a film having a residual solvent content of 62.5%. The resulting film was immersed in cold water, and washed with water in the same way as in Example 1 to form a water wetted film. The wet film lacked transparency, and was turbid. It had a water content of 62%. The wet film was stretched simultaneously in the machine and transverse directions at a stretch ratio of 2.3 in each direction at room temperature, and then dried at 110° C for 30 minutes. The resulting film had a dielectric strength of 136 kv/mm, and was inferior to the film obtained in Example 1.

COMPARATIVE EXAMPLE 4

The film having a residual solvent content of 38.5% obtained in Example 1 was immersed in water at 30° C for 1 minute, and then washed with flowing water at the same temperature for 30 minutes to afford a water wetted film having a water content of 53%. The wet film obtained lacked transparency and was turbid. It was stretched in the same way as in Example 1, but the resulting film had a dielectric strength of as low as 116 kv/mm. Even when this film was heated in the same way as in Example 1, its dielectric strength was not improved.

EXAMPLE 2

Example 1 was repeated except that 6.5 parts of p-phenylenediamine and 58.3 parts of m-phenylenediamine were used instead of 64.8 parts of m-phenylenediamine. Thus, a poly(m-phenylene/p-phenylene (90/10) isophthalamide) copolymer having a logarithmic viscosity [$\eta_{inh}$] of 1.65 determined as in Example 1 was isolated.

20 parts of the isolated copolymer was mixed with 80 parts of N-methyl-2-pyrrolidone in a nitrogen atmosphere at room temperature for 1 hour, and then at 80° C for 1 hour to form a uniform solution. The solution was cast and dried in the same way as in Example 1 to form a film having a residual solvent content of 35.0%. The resulting film was immersed for 60 minutes in an aqueous solution kept at 5° C containing 7% of N-methyl-2-pyrrolidone and 5% of calcium chloride to form a wet film containing 51% of the aqueous solution. The wet film was stretched simultaneously both in the machine and transverse directions at a stretch ratio of 2.3 in each direction, washed with water at 80° C for 10 minutes, and then dried at 110° C for 30 minutes to form a transparent film. The resulting film had a thickness of 0.025 mm, a dielectric strength of 225 kv/mm, a tensile strength at break of 25 kg/mm² both in the machine and transverse directions, and an elongation at break of 79% in both directions.

COMPARATIVE EXAMPLE 5

The wet film containing 51% of the aqueous solution as obtained in Example 2 was stretched simultaneously in the machine and transverse directions at a stretch ratio of 1.3 in each direction, washed with water at 80° C for 10 minutes, and dried at 110° C for 30 minutes to form a transparent film. The resulting film had a dielectric strength of 136 kv/mm, a tensile strength at break of 13 kg/mm² both in the machine and transverse directions, and an elongation at break of 89% in both directions.

EXAMPLE 3 AND COMPARATIVE EXAMPLE 6

The water wetted film obtained in Example 1 was stretched by different stretching methods and at different stretch ratios as given in Table 1 below, and then dried in the same way as in Example 1 to form poly(m-phenylene isophthalamide) films. The stretching conditions and the properties of the resulting films are shown in Table 1.

TABLE 1

| Examples | Method of Stretching | Stretch Ratio (times) Machine × Transverse | Dielectric Strength | Tensile Strength (kg/mm²) Machine Direction | Transverse Direction |
|---|---|---|---|---|---|
| Example | | | | | |
| 3-1 | Monoaxial stetching | 1.5 × 1.0 | 187 | 20 | 11 |
| 3-2 | " | 2.0 × 1.0 | 205 | 25 | 10 |
| 3-3 | Successive biaxial stretching | 1.5 × 1.3 | 203 | 18 | 18 |
| 3-4 | " | 2.0 × 1.5 | 212 | 24 | 21 |
| 3-5 | Simultaneous biaxial stretching | 1.5 × 1.3 | 203 | 19 | 18 |
| 3-6 | " | 2.0 × 1.5 | 213 | 25 | 23 |
| Comparative Example | | | | | |
| 6-1 | Monoaxial stretching | 1.3 × 1.0 | 116 | 13 | 9 |
| 6-2 | Successive biaxial stretching | 1.3 × 1.3 | 122 | 13 | 13 |
| 6-3 | Simultaneous biaxial stretching | 1.3 × 1.3 | 125 | 14 | 13 |

water wetted film substantially free from N,N-dimethyl formamide and lithium chloride with the residual content of each of N,N-dimethyl formamide and lithium chloride being less than 1% each. The wet film had a water content of 48%.

The resulting wet film was stretched biaxially at room temperature at a stretch ratio of 2.6 in each direction, and then dried at 110° C for 30 minutes to form a poly(m-phenylene isophthalamide) film having a thickness of 50 microns. The resulting film had a dielectric strength of 255 kv/mm, a tensile strength at break of 28 kg/mm² both in the machine and transverse directions, and an elongation at break of 65% in both directions, thus showing very superior properties.

While the invention has been described in detail and with reference to specific embodiments thereof, it will be apparent to one skilled in the art that various changes and modifications can be made therein without departing from the spirit and scope thereof.

What is claimed is:

1. A process for producing an aromatic polyamide film from a solution comprising an aromatic polyamide in which at least about 50 mol% of its entire structural units are recurring units of the general formula:

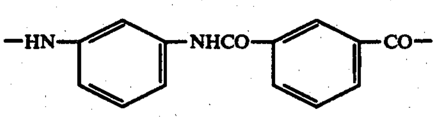

and an amide type solvent, which comprises casting said solution, drying the cast product to form a film having a residual solvent content of not more than about 60% by weight, immersing the film in an aqueous medium kept at not more than about 20° C, and stretching the resulting wet film containing at least about 5% by weight, based on the weight of the wet film, of the aqueous medium in at least one direction at a stretch ratio of at least about 1.4.

2. The process of claim 1, wherein said amide type solvent is N,N-dimethyl acetamide, N-methyl-2-pyrrolidone, or N,N-dimethyl formamide.

3. The process of claim 1, wherein said amide type solvent contains an inorganic salt.

EXAMPLE 4

20 parts of poly(m-phenylene isophthalamide) isolated from the reaction mixture obtained in Example 1, 3 parts of lithium chloride and 77 parts of N,N-dimethyl formamide were mixed in a stream of nitrogen at room temperature for 1 hour, and then at 80° C for an additional 2 hours to form a uniform polymer solution. The polymer solution was cast on a glass plate, and dried for 10 minutes in a hot air dryer at 115° C to form a film having a residual solvent content of 36.5%. The resulting film was withdrawn from the dryer, and immediately immersed in water at 10° C for 2 hours to form a 4. The process of claim 3, wherein said inorganic salt is lithium chloride or calcium chloride.

5. The process of claim 1, wherein said residual solvent content is not more than 50% by weight.

6. The process of claim 1, wherein said residual solvent content is 20 to 40% by weight.

7. The process of claim 1, wherein said aqueous medium kept at not more than about 20° C is an aqueous solution containing not more than about 40% by weight, based on the weight of the aqueous solution, of an amide type solvent.

8. The process of claim 7, wherein said amide type solvent is N,N-dimethyl acetamide, N-methyl-2-pyrrolidone or N,N-dimethyl formamide.

9. The process of claim 1, wherein said aqueous medium kept at not more than about 20° C is water.

10. The process of claim 1, wherein the temperature of the aqueous medium in which the film is immersed is not more than 10° C.

11. The process of claim 1, wherein the content of the aqueous medium in the wet film is at least 20% by weight.

12. The process of claim 1, wherein said aqueous medium in the wet film is an aqueous solution containing not more than about 40% by weight, based on the weight of the aqueous solution, of an amide type solvent.

13. The process of claim 12, wherein the amount of the amide type solvent is not more than about 20% by weight based on the weight of the aqueous solution.

14. The process of claim 12, wherein the amount of the amide type solvent is not more than about 10% by weight based on the weight of the aqueous solution.

15. The process of claim 12, wherein said amide type solvent is N,N-dimethyl acetamide, N-methyl-2-pyrrolidone or N,N-dimethyl formamide.

16. The process of claim 1, wherein the aqueous medium in the wet film is water.

17. The process of claim 1, wherein said wet film is stretched in one direction at a stretch ratio of at least 1.5.

18. The process of claim 1, wherein said wet film is stretched in one direction at a stretch ratio of at least 2.0.

19. The process of claim 1, wherein said wet film is biaxially stretched at a stretch ratio of at least 1.3 in one direction and at a stretch ratio of at least 1.5 in another direction at right angles to the first direction.

20. The process of claim 1, wherein said wet film is stretched axially at a stretch ratio of at least 1.3 in one direction, and at a stretch ratio of at least 2.0 in another direction at right angles to the first direction.

* * * * *